(12) United States Patent
Pepe (10) Patent No.: US 6,473,205 B1
(45) Date of Patent: Oct. 29, 2002

(54) IMAGE SENSOR MODULE ADJUSTABLE IN SIX DEGREES OF FREEDOM FOR USE WITH AN IMAGE ACQUISITION DEVICE

(75) Inventor: Robert D. Pepe, Dracut, MA (US)

(73) Assignee: Agfa Corporation, Wilmington, DE (US)

( * ) Notice: Subject to any disclaimer, the term of this patent is extended or adjusted under 35 U.S.C. 154(b) by 0 days.

(21) Appl. No.: 09/090,041

(22) Filed: Jun. 3, 1998

(51) Int. Cl.$^7$ ................................................. H04N 1/40
(52) U.S. Cl. ..................................... 358/483; 250/252.1
(58) Field of Search ................................ 358/483, 474, 358/487, 494, 497, 475, 491, 488; 250/252.1

(56) References Cited

U.S. PATENT DOCUMENTS

| | | | |
|---|---|---|---|
| 4,408,231 A | | 10/1983 | Bushaw et al. ............. 358/280 |
| 5,075,539 A | * | 12/1991 | Shiraishi .................. 250/208.1 |
| 5,252,818 A | | 10/1993 | Gerlach et al. ........... 250/208.1 |
| 5,303,064 A | | 4/1994 | Johnson et al. ............. 358/406 |
| 5,444,481 A | | 8/1995 | Oshima et al. .............. 348/187 |
| 5,696,609 A | * | 12/1997 | Cresens ....................... 358/474 |

OTHER PUBLICATIONS

Kingsley, W., "Flexure Differential Screw Alignment," Xerox Disclosure Journal, 6(4):205 (Aug. 1981).

* cited by examiner

*Primary Examiner*—Jerome Grant, II
*Assistant Examiner*—Negussie Worku
(74) *Attorney, Agent, or Firm*—J. Grant Houston; Robert A. Sabourin (57) ABSTRACT

An image sensor sub-assembly for a scanner or other image acquisition device includes an image sensor array that detects light imaged by a scanner optical system and an image sensor module that enables calibration of the position of the image sensor array relative to the optical system. In this way, with the optical system being constructed within tolerances, the module enables alignment of the image sensor array to the optical system by its adjustment. Preferably, the sensor module is calibrated to defined standards, making the optical system's calibration independent of the specific module and the module's calibration independent of the specific optical system used in a given scanner. Preferably, the module enables positioning of the sensor array with six degrees of freedom. Further, the electronic circuit board, on which the sensor array is integrated, is separate from the board, on which the analog to digital converters are located. This has the advantage of enabling replacement of the analog to digital converters, a primary source of improper operation in the scanner's electronic components, without requiring the replacement of the optical sensor array, and thus re-alignment.

35 Claims, 8 Drawing Sheets

IMAGE SENSOR MODULE ADJUSTABLE IN SIX DEGREES OF FREEDOM FOR USE WITH AN IMAGE ACQUISITION DEVICE

BACKGROUND OF THE INVENTION

Digital image acquisition devices, e.g., scanners, digital copiers, and 5 digital cameras, are used to digitize the graphic content, be it color or black and white photographs, artwork, text, and other graphics, from reflective and/or transmissive original documents. This capability is useful in digital document storage, digital content generation, and in more industrial pre-process environments. In this latter implementation, chemical film-based photographs, for example, can be digitally scanned for pre-print review, followed by production printing.

Considering the example of the scanners, one of the most common configurations is the flat-bed scanner. A transmissive or reflective original document is placed face down on a bed having a glass plate. A carriage, under the glass plate, with a slit aperture facing the document, is then scanned over the original document. An optical system in the carriage successively picks-off scan lines. In the one configuration, a single fold mirror is used in a high-resolution mode, and a series of larger fold mirrors are used in a low-resolution mode. In either case, the fold mirror(s) relay the scanned lines to high or low resolution imaging lens, also of the optical system, which image the scan lines onto a linear or two dimensional image sensor. In the most common implementation, the image sensor is a trilinear charge-coupled device (CCD) array, although newer CMOS-based image sensors are becoming increasingly popular.

An exemplary flat-bed scanning system is disclosed in U.S. Pat. No. 5,696,609 to Cresens et al. and assigned to AGFA Division, Bayer Corporation. This patent is incorporated herein in its entirety by this reference.

Calibration is a substantial cost factor in the manufacture of scanners and other image acquisition devices. In a scanner, the carriage's optical system, including the slit aperture, relay optics, and imaging optics, must be aligned to the image sensor array so that an image of the scan line is properly formed on the sensor array. Moreover, the optical system calibration must be robust. After manufacture, these devices are many times transferred by commercial shippers around the world where exposure to shock and temperature extremes take place.

The most common calibration technique in a scanner involves attaching a prealigned CCD sensor array to the carriage. The relay optics and imaging optics are then finely tuned to the required level of alignment with the attached sensor array.

SUMMARY OF THE INVENTION

A number of problems exist or arise in the course of conventional calibration of an image acquisition device, the most significant of which is the complexity of the calibration protocols. For instance in a scanner, the properly-located scan line must be picked off through the slit aperture by the relay optics and transferred to the image sensor array. Moreover, the image of the scan line must be formed such that it is in focus across the entire two-dimensional sensor array. If the image plane is decentered, clocked, tipped, or tilted relative to the plane of the sensor, re-alignment of the relay optics is performed, which can affect the location of the scan line. Thus, calibration requires simultaneously managing multiple independent variables. Specifically, for two dimensional sensor arrays, tilting is very important for color registration.

Moreover, in existing scanners, in-field re-calibration and/or image sensor array replacement/upgrading is very difficult. It is not uncommon for the sensor arrays to fail in the field. The cause can be related to shipment, normal operation, or electrical surge damage. Additionally, the image sensors are sometimes replaced to increase the scanner's resolution as higher density sensors In these situations, the optics in conventional systems must be re-calibrated since the new image sensor array cannot be attached to the carriage in exactly the same orientation as the old sensor. Without proper calibration, the increase in resolution achievable by a new image sensor, for example, may not be realized because of poor image formation on the device. Calibration in the field, however, is even more difficult due to the unavailability of the special-purpose equipment and jigs used to facilitate calibration in the production environment.

The principles of the present invention are directed towards any image acquisition device, such as a scanner, digital copier, or digital camera. As such, the device comprises an image sensor array that detects light imaged by an optical system and an image sensor module that enables calibration of the position of the image sensor array relative to the optical system. In this way, with the optical system being constructed within tolerances, the module enables alignment of the image sensor array to the optical system. Preferably, the sensor module is separately calibrated to defined standards, making the optical system's calibration independent of the specific module and the module's calibration independent of the specific optical system used in a given image acquisition device.

Preferably, the module enables positioning of the sensor array with six degrees of freedom, allowing it to be aligned completely independently of the optical system. Further, the electronic circuit board, on which the sensor array is integrated, is separate from the mother board, on which the analog to digital converters are located. This has the advantage of enabling replacement of the analog to digital converters, a primary source of improper operation in the electronic components, without requiring the replacement of the expensive optical sensor array, coupled with the difficulty of re-alignment.

In general, according to one aspect, the invention features an image sensor module for an image acquisition device. The module comprises a base plate that is adapted to be mounted to an optical system, and specifically the carriage. An image sensor mounting bracket is adapted to carry the image sensor array. The mounting bracket is positionable relative to the base plate to enable alignment of the image sensor array to the optical system.

In a preferred embodiment, the mounting bracket is adjustable relative to the base plate in three degrees of freedom. Specifically, it is translationally adjustable along a z-axis, which is defined as being orthogonal to the image plane of the image sensor array; rotationally adjustable relative to a y-axis, which is defined as running parallel to a longitudinal axis of the image sensor array; and rotationally adjustable relative to an x-axis, which is defined as running parallel to a transverse axis of the image sensor array.

More specifically, a bracket position alignment system is provided that comprises at least one support pin for pre-loading the mounting bracket relative to the base plate and at least one set screw for controlling a distance between the mounting bracket and a base plate.

In the preferred embodiment, two support pins are used for preloading, and three set screws are used for distance control between the bracket and base plate.

Further, a base plate position alignment system enables the base plate, and thus the image sensor array, to be oriented relative to the optical system. Preferably, the base plate alignment system provides the three additional degrees of freedom. Specifically, the base plate is translationally adjustable relative to the optical system along the y-axis, rotationally adjustable relative to the z-axis, and translationally adjustable relative to the x-axis.

Thus, the base plate position alignment system in combination with the bracket position alignment system provide a total of six discrete degrees of freedom in the positioning of the sensor array relative to the optical system.

In other aspects of the preferred embodiments, the sensor array is bonded to the image sensor mounting bracket. A daughterboard, supporting the analog signal processing of the signals from the sensor array and sampling control for the array, is provided on a daughter card that is supported by the image sensor array. Preferably, the analog to digital converters that digitize these signals from the sensor array are located on a separate mother board, connected to the daughterboard by a shielded jumper. This enables the replacement of the mother board with its analog to digital converters without necessitating the removal or replacement of the daughterboard, which must be aligned to the optical system and contains the expensive sensor array.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF THE PREFERRED EMBODIMENTS

Figure 1:
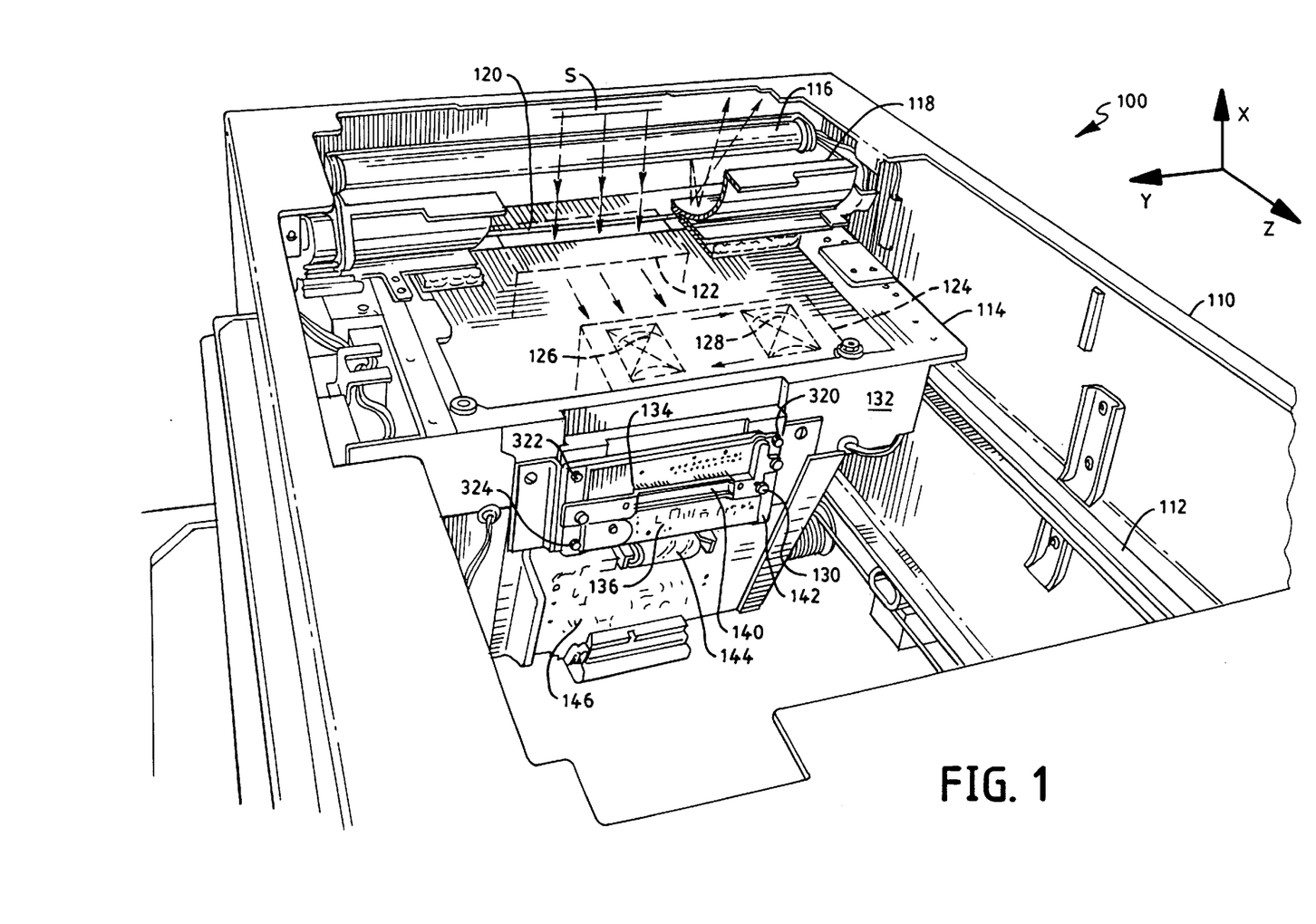
FIG. 1 is a perspective view of a flat-bed scanner incorporating the present invention.

FIG. 1 shows the main components of a flat-bed scanner incorporating the principles of the present invention.

Generally, the scanner 100 comprises a housing or frame 110. Secured to the housing 110 and extending longitudinally or in the direction parallel to the z-axis are two rails 112. Only the right rail is actually shown due to the perspective. These rails 112 support an optical system carriage 114 that picks-off scan lines s extending in the direction of the y-axis while scanning or traveling in the z-axis.

An illuminator 116 is installed on the carriage 114. Preferably, a reflector system 118 is used to concentrate light from the illuminator 116 on the original document to be scanned. In the preferred embodiment, the reflectors are movable between two positions depending upon whether or not a reflective or transmissive original is being scanned. In either case, light from the scanned lines s passes into the carriage through a slit aperture 120. Housed within the carriage are relay optics 122 and imaging optics 124. In the preferred embodiment, two imaging lens systems are provided 126, 128. They are movable alternatively into the optical path to provide for high or low resolution scanning.

An image sensor module 130 is secured to the front face 132 of the carriage 114 by three bolts 320, 322, 324. This module 130 carries the image sensor array 134/sensor daughterboard 136. The sensor module 130 comprises an image sensor mounting bracket 140 and base plate 142.

The daughterboard 136 carries the electronics needed to control the image sensor array and to amplify the analog pixel information. The analog signals generated by the sensor array, however, are not digitized on the daughterboard 136.

Instead they are transferred via a metal shielded jumper 144 to a mother board 146. The mother board houses the analog to digital converters necessary to digitize the analog signals representing the scanned images from the image sensor array 134.

The advantage of the separation of the analog to digital converters on the mother board 146 with the image sensor array on a daughterboard 136 is that the analog to digital converters are replaceable without requiring removal of the image sensor array 134. Past experience has demonstrated that the analog to digital converters need to be replaced relatively frequently because of electronic problems. In this configuration, they are replaceable without requiring the removal of the expensive tri-linear CCD array 134 or its realignment.

Figure 2:
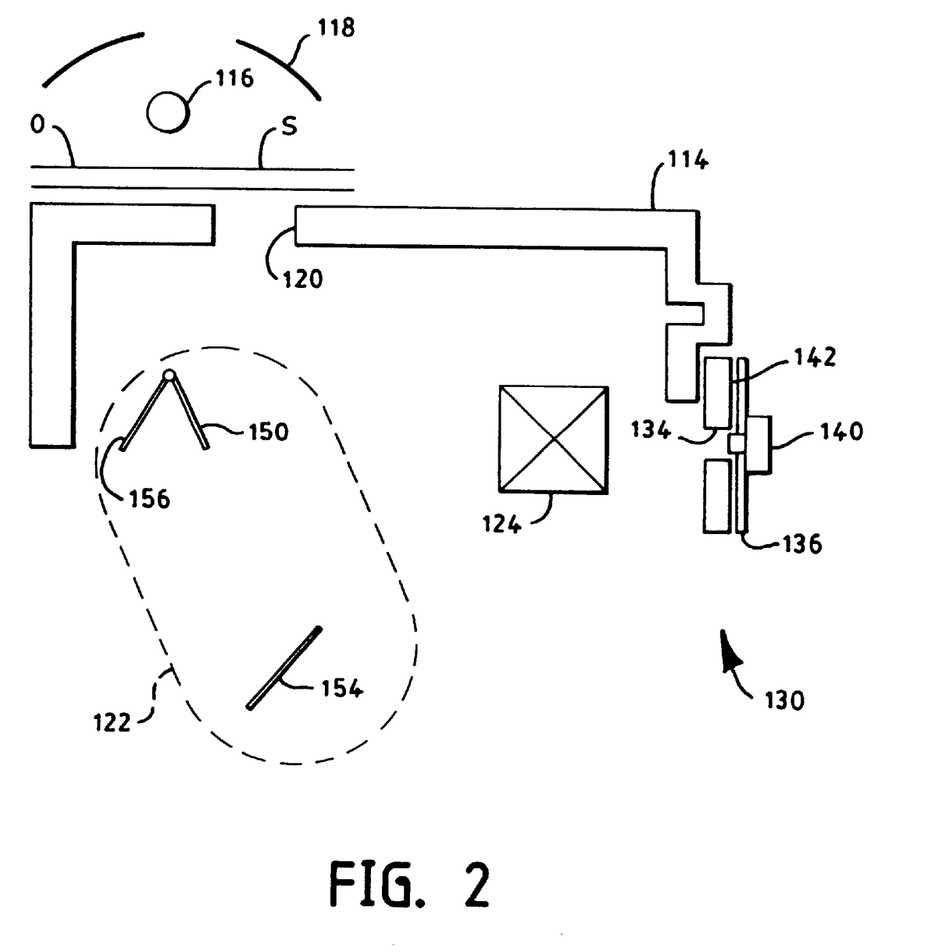
FIG. 2 is a schematic cross-sectional view of the scanner optical system and its relationship to the inventive image sensor module.

FIG. 2 shows the internal arrangement of the optical system carriage. Specifically, reflectors 118, configured for transparent original scanning, surround the illuminator 116 to direct the light through the original o to slit aperture 120. The light is passed to relay optics 122, which direct the light to imaging optics 124. The imaging optics 124 form an image of the scan line s on the image sensor array 134 held on the module 130.

In the preferred embodiment, two sets of relay optics are used. Specifically, a single fold mirror 150 is moved into the optical path for high-resolution scanning. During low-resolution scanning, the fold mirror 150 is brought out of the optical path so that the light travels to the low-resolution fold mirrors 154 and 156. The light reflects off the fold mirror 154 to the fold mirror 156 which re-directs the light to the imaging optics 124.

Figure 3:
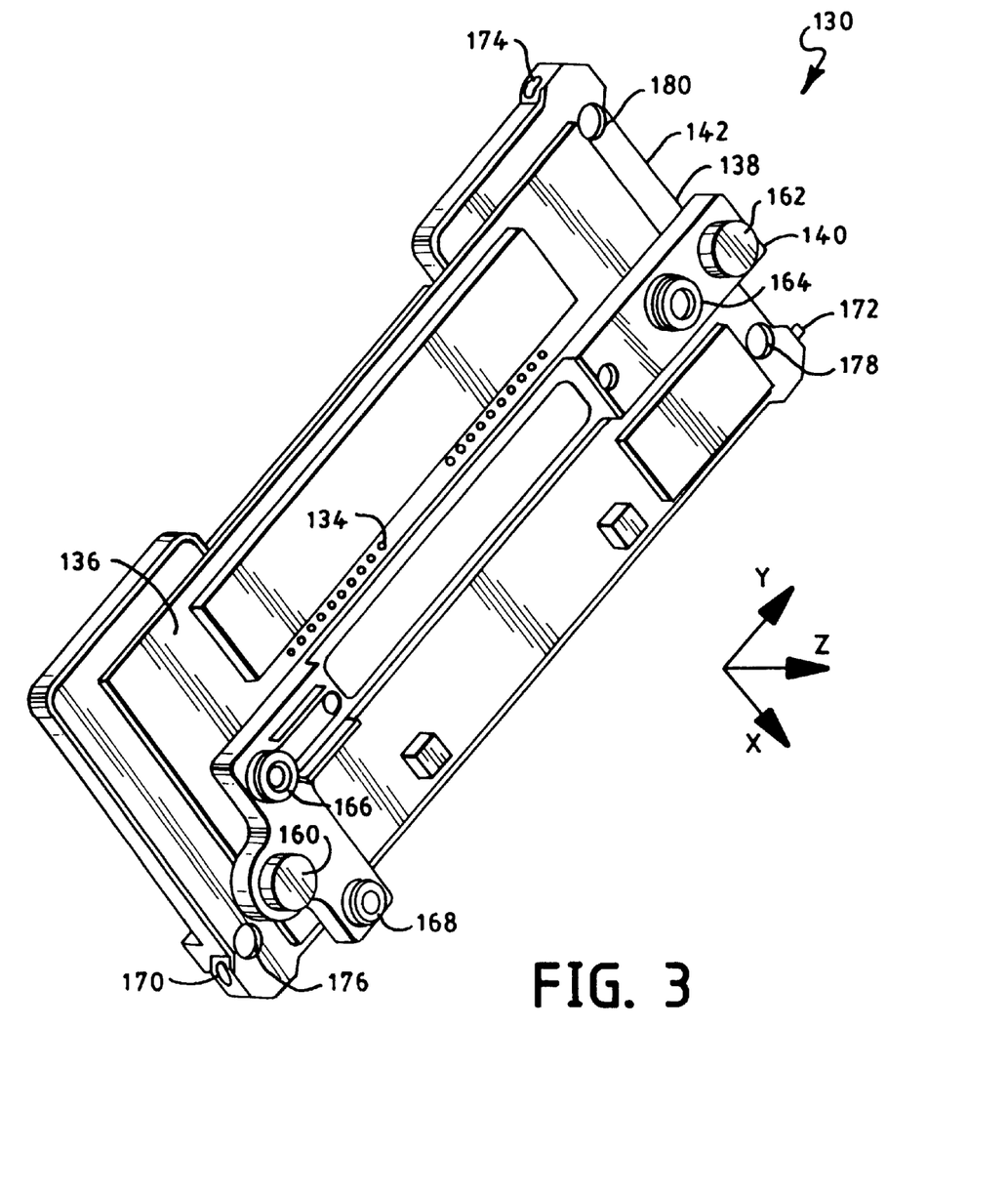
FIG. 3 is a perspective view of a front face of the image sensor module according to the present invention.

FIG. 3 is a detailed perspective view of the image sensor module 130 according to the present invention. As shown, the base plate 142 is essentially rectangular. It supports the image sensor mounting bracket 140 by two pins 160, 162, which provide preloading between the bracket 140 and the base plate 142. A bracket position alignment system comprises three bracket set screws 164, 166, 168. These hardened ball tipped set screws 164, 166, 168 engage threads in the bracket 140, project perpendicularly away from rear face of the bracket, and extend through the daughterboard 136, to engage the front face of the base plate 142.

By adjustment of the set screws 164, 166, 168 of the bracket position alignment system, the distance between the bracket 140 and the base plate 142 is controlled at three locations. In total, this provides adjustment of the sensor array 134 in three degrees of freedom. Specifically, set screws 164 and 166 are used together to translate the sensor array 134 along the z-axis, which is defined as being orthogonal to the image plane of the image sensor array 134. Set screws 164, 166 are adjusted individually or counter to each other to rotate the image sensor array relative to the x-axis. The x-axis is defined as running parallel to the transverse axis of the image sensor array 134. Finally, set screw 168 is used to adjust the rotation of the image sensor array relative to a y-axis. The y-axis is defined as running parallel to a longitudinal axis of the image sensor array 134.

FIG. 3 further shows a base plate position alignment system comprising dog-point set screws 170, 172, 174. The base plate set screws 170, 172, 174 mate with threads tapped at 45° through the corners of the base plate 142. The base plate alignment system provides three additional degrees of freedom in the positioning of the sensor array 134 by enabling adjustment of the base plate in a mount on the carriage 114. Specifically, adjustment of plate set screws 172 and 170 together provide for translational adjustment of the base plate 142 in the mount along the x-axis. The adjustment of set screws 170 or 172 either counter to each other or individually rotate the base plate around the z-axis. Finally, adjustment of set screw 174 provides for translational adjustment along the y-axis. Once the base plate 142 is properly registered and aligned in the mount, it is bolted to the carriage 114 by the plate bolts 320, 322, 324 passing through bolt holes 176, 178, 180.

Figure 4:
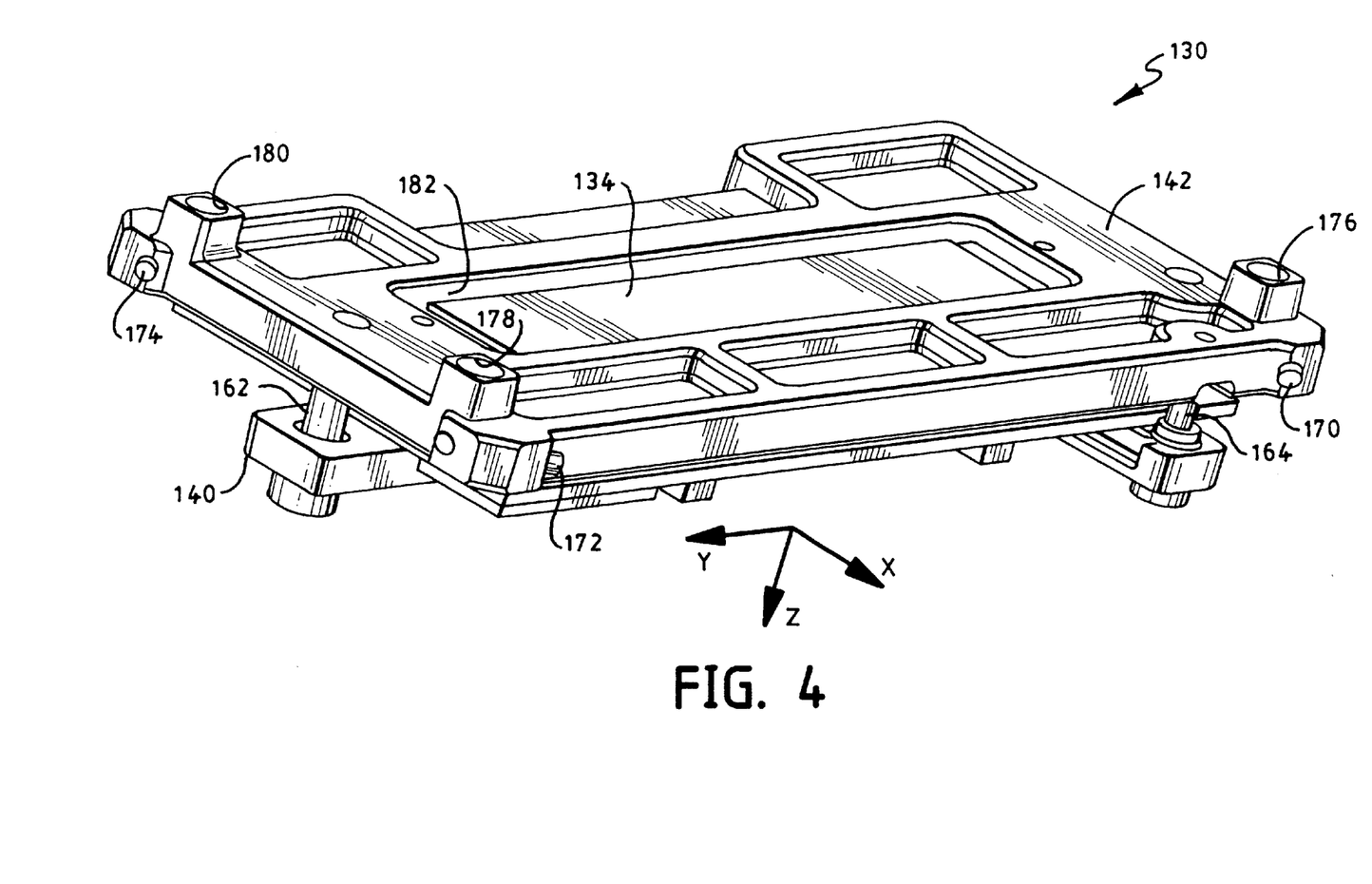
FIG. 4 is a perspective view showing the rear face of the inventive image sensor module.

FIG. 4 is another perspective view of the sensor module 130 showing its rear face. This view best shows the CCD array 134 and its position within an aperture 182 in the center of the base plate 142.

Figure 5:
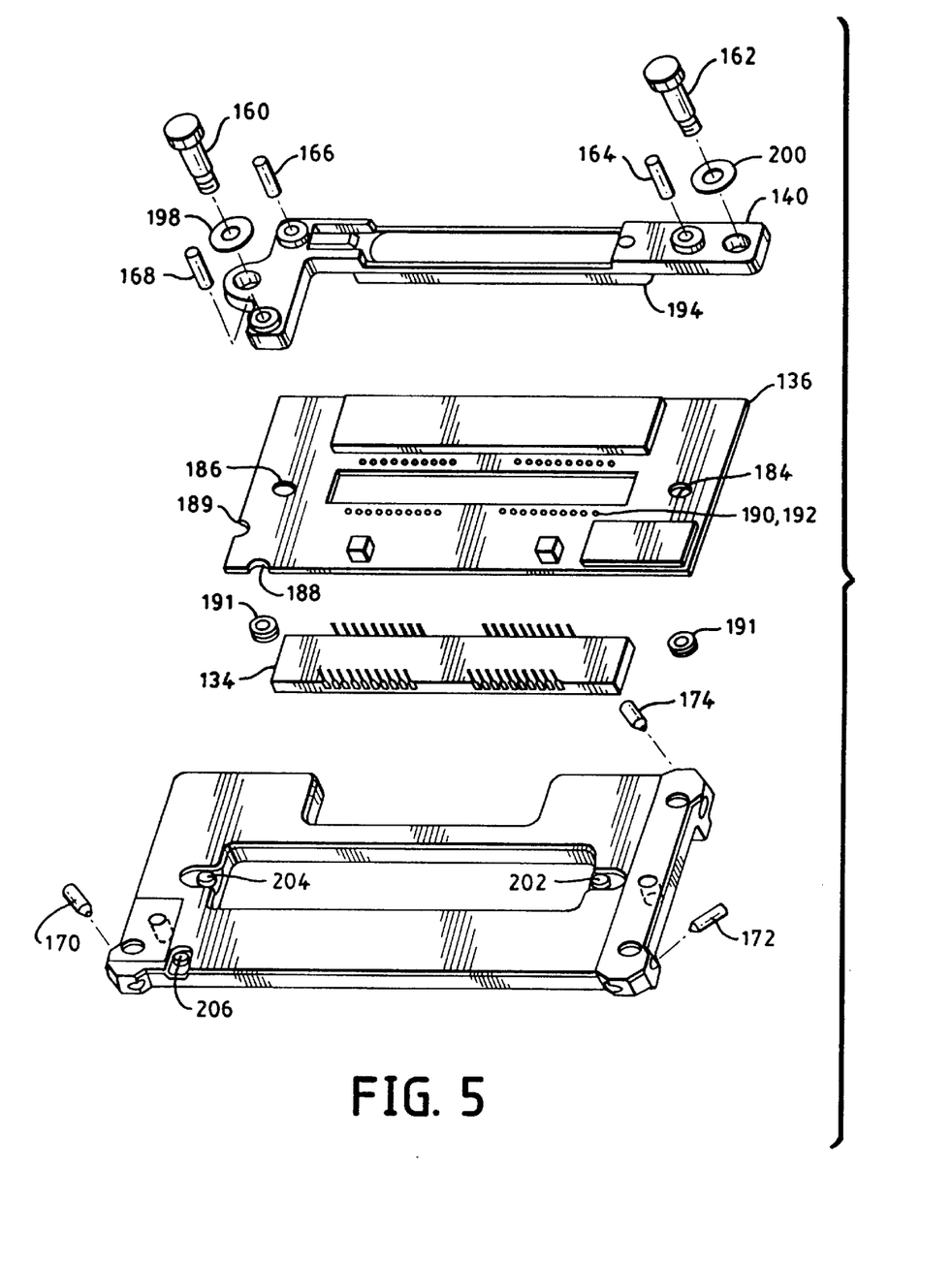
FIG. 5 is an exploded, perspective view of the inventive image sensor module.

FIG. 5 is an exploded view of the module 130. This view shows the method by which the sensor array 134 is installed on the daughterboard 136. Specifically, its pins 190 extend through holes 192 in the daughterboard 136 to provide mechanical and electrical mating between the sensor array and daughterboard as is convention for chip-to-circuit board connection. Distinguishing the arrangement is the fact that the sensor array 134 is then bonded to block 194, which is integral with the image sensor mounting bracket 140. The daughterboard 136 is actually mechanically supported by the sensor chip. In this way, the sensor array 134 is directly attached to the rigid metal bracket 140.

In previous systems, the sensor arrays were supported by the daughterboard. This subjected alignment to any mechanical instabilities associated with daughterboard. The direct bonding of the CCD array to the metal bracket avoids these variables in the preferred embodiment.

Relative to the bracket position alignment system, also shown in the exploded view of FIG. 5, curved washers 198, 200 that are installed on the shafts of the preload pins 160, 162, respectively, between the head of the preload pins and the mounting bracket 140. These have the effect of biasing or urging the bracket 140 in the direction of the base plate 142, which forces the tips of the bracket set screws 164, 166, 168 into engagement with set screw engagement regions 202, 204, 206 of the base plate 142. This provide a mechanically stable system, which has good mechanical shock survivability and robust calibration.

Also shown are the holes in the daughterboard 136 that enable the bracket set screws 164-168 and preload pin 168 to engage the base plate without contacting the daughterboard. Specifically, holes 184, 186, 188 provide clearance for set screw 164, 166, 168, respectively, with threaded shoulder washers 191 being used. Partial hole 189 provides clearance for preload pin 160.

Figure 6:
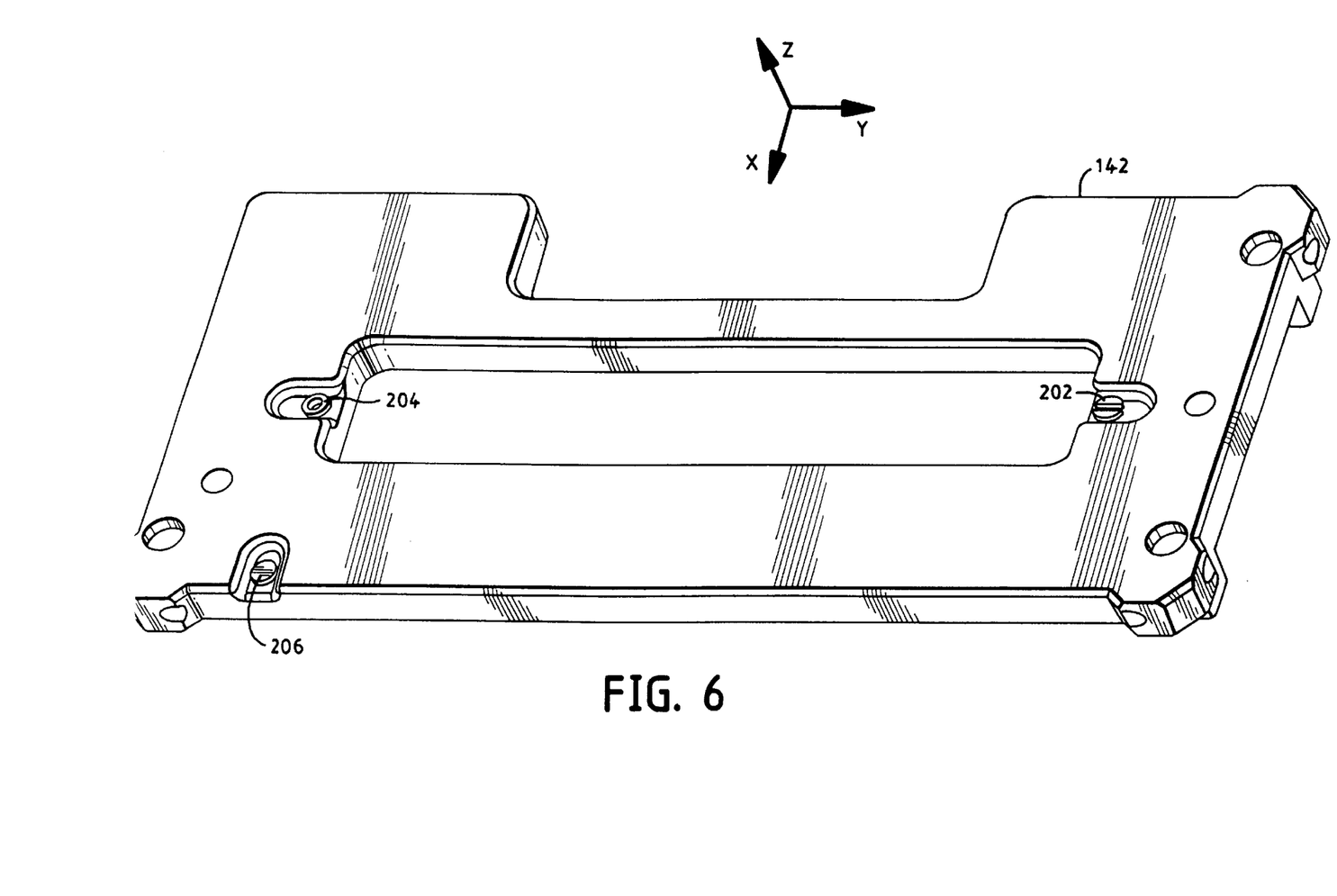
FIG. 6 is a detailed view showing the configuration of the front face of the base plate of the inventive image sensor module.

FIG. 6 is a perspective view showing the front face of the base plate 142. This view is useful for understanding the set screw engagement regions 202, 204, 206 that form the mechanical interface between the ball points of the bracket set screws 164, 166, 168 and the base plate 142.

In the preferred embodiment, set screw engagement region 204 has a conical, preferably hardened, indentation. As a result, when a ball point of set screw 166 is driven into engagement with set screw engagement region 204, the set screw is restricted from movement in the plane of the base plate 142.

Contrastingly, set screw engagement region 202, which the ball point of the set screw 264 engages, has a depressed, V-shaped, and hardened, engagement region. This allows set screw 164 to move or slide along the y-axis relative to the base plate 142. This allows for expansion and contraction to take place between the bracket 140 and the base plate 142.

Although, in the preferred embodiment, the bracket 140 and base plate 142 are both constructed from die-cast aluminum, and consequently, have the same coefficients of thermal expansion, they are sometimes exposed to different thermal gradients depending due to heat dissipation through the sensor array 134 and daughterboard 136, causing one to expand and contract more than the other. Such thermal expansion and contraction is accommodated in the junction between the bracket 140 and the base plate 142 by allowing set screw 164 to smoothly travel in the V of the set screw engagement region 202.

Finally, set screw engagement region 206 has a flat hardened surface. Since the combination of the cone indent in engagement region 204 and the V of engagement region 202, the movement of the bracket is restricted to y-axis movement. Therefore, region 206 is flat to accommodate this relative movement.

Figure 7:
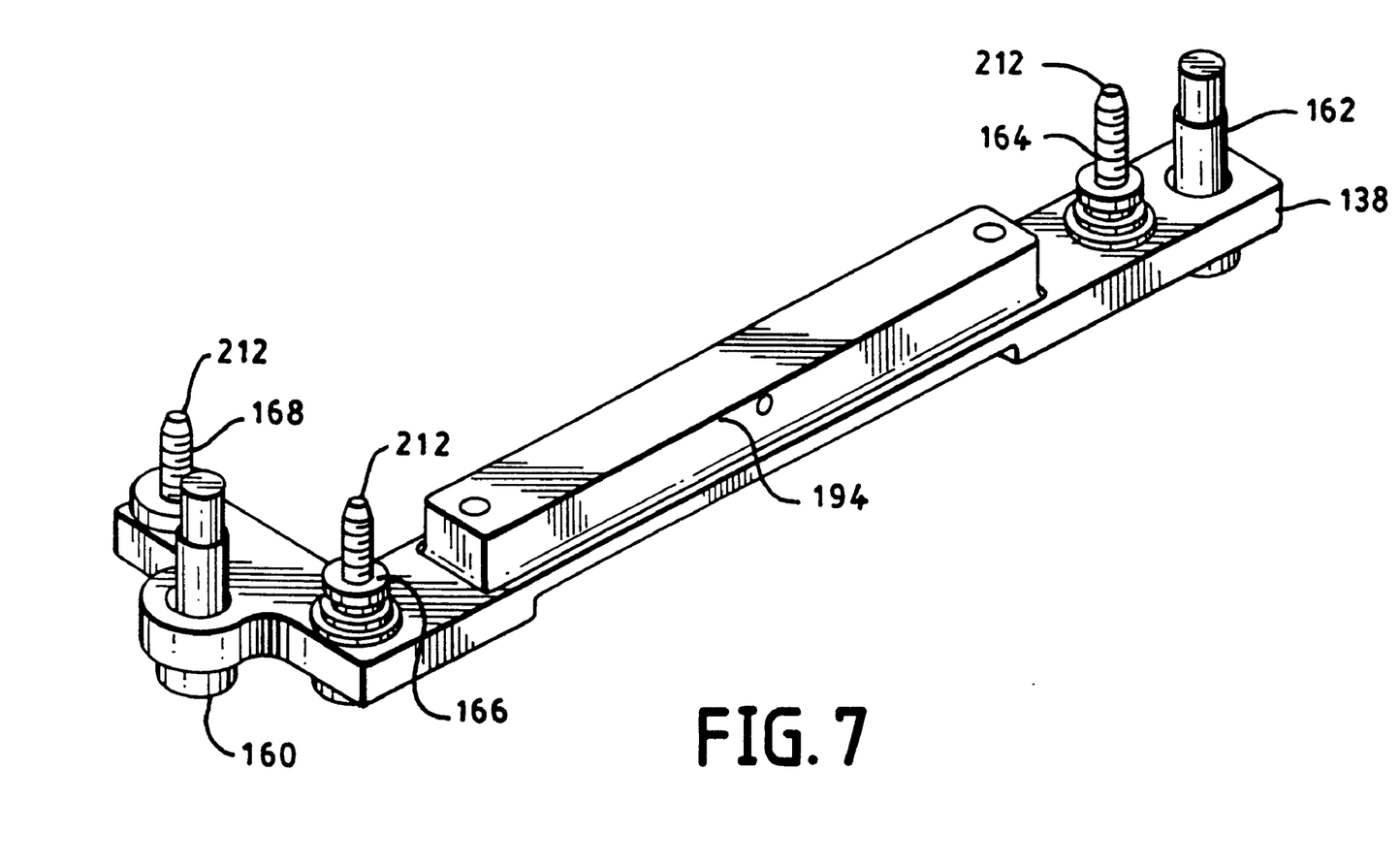
FIG. 7 is a perspective view showing a bottom face of the optical sensor mounting bracket of the inventive image sensor module.

FIG. 7 is a perspective view showing the front side of the sensor bracket 140. This view shows the ball tips 212 on the bracket set screws 164, 166, 168. Additionally, it shows the block 194 to which the sensor array 134 is bonded.

Figure 8:
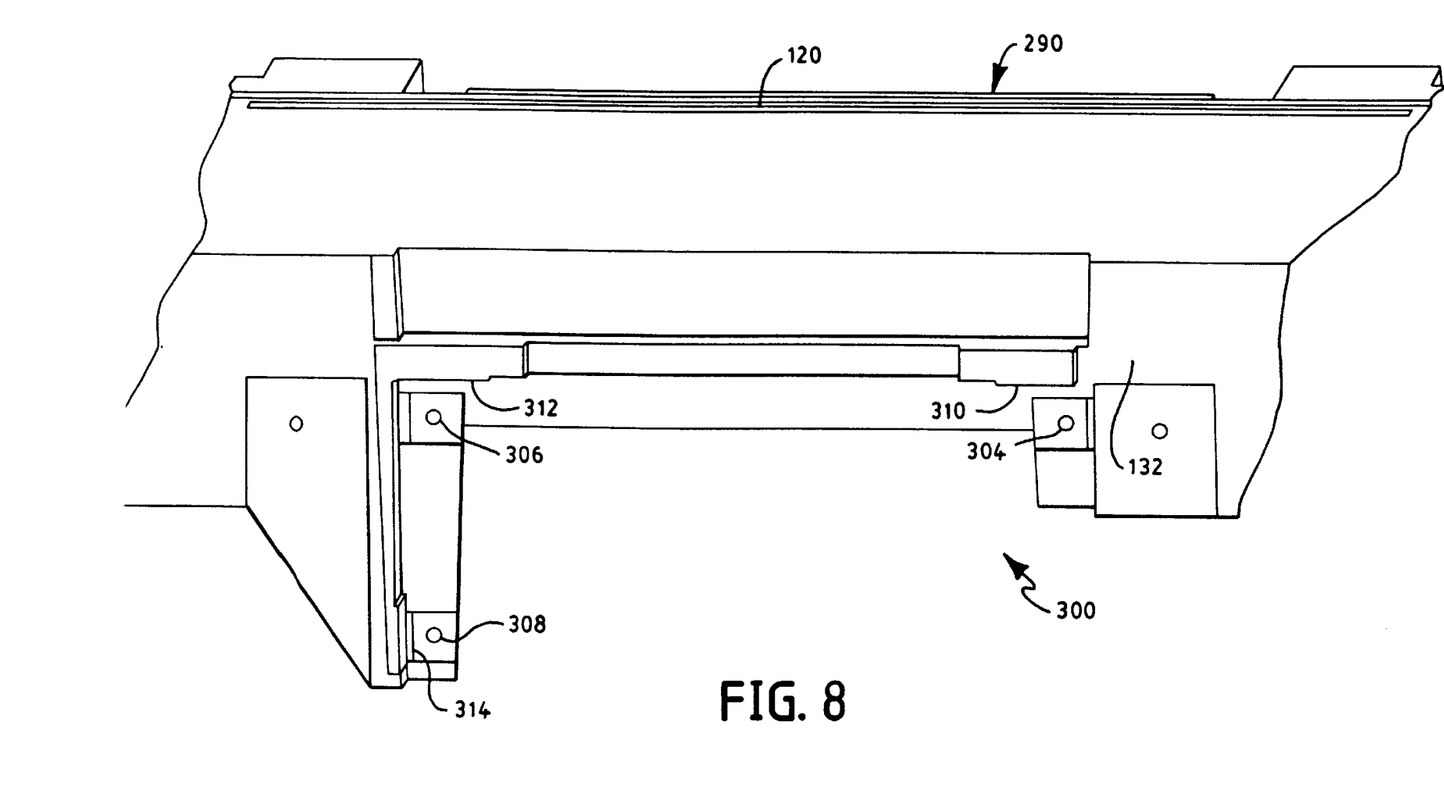
FIG. 8 is a perspective view showing the module mount on the carriage of the optical system that receives the image sensor module.

FIG. 8 is a perspective view showing the carriage 114 and the mounting area 300 for the module 130. Specifically, the three holes 304, 306, 308 are formed in the frame 290 of the carriage 114. This allows the module 130 to be bolted to the carriage 114 by the three module bolts 320, 322, 324 (shown in FIG. 1). Also shown are three engagement surfaces 310, 312, 314. These form part of the base plate position alignment system. Specifically, the dog-point of base plate adjustment screw 174 engages surface 314, base set screw 172 engages surface 312, and base set screw 170 engages surface 310. Thus, by first registering the dog-points of each of the base set screws 170, 172, 174 against the corresponding engagement surfaces 310, 312, 314, the base plate 142 is placed into a predetermined arrangement with the carriage 114 and its optical system. The arrangement is then secured by tightening the three module bolts 320, 322, 324. The view of FIG. 8 also shows the slit aperture 120 that allows light to pass to the relay optics.

In the preferred embodiment, the set screws are locked from moving out of adjustment by a screw sealant such as VIBRA-TITE® sold by ND Industries.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An image sensor module for use with an image acquisition device, said module comprising:
    a base plate that is adapted to be mounted to an optical system;
    an image sensor mounting bracket that is adapted to carry an image sensor array that detects images formed by the optical system, the mounting bracket being positionable relative to the base plate to calibrate the image sensor array to the optical system; and
    a base plate position adjusting system enabling the base plate, and thus the image sensor array, to be oriented relative to the optical system, the base plate position adjusting system including multiple set screws extending between a module mounting area of the optical system and the base plate, the adjustment of the multiple set screws enabling the base plate to be moved and thus the image sensor array with at least three degrees of freedom.

2. An image sensor module as described in claim 1, wherein the mounting bracket is translationally adjustable along a z-axis, which is defined as being orthogonal to an image plane of the image sensor array.

3. An image sensor module as described in claim 2, wherein the mounting bracket is rotationally adjustable relative to a y-axis, which is defined as running parallel to a longitudinal axis of the image sensor array.

4. An image sensor module as described in claim 3, wherein the mounting bracket is rotationally adjustable relative to an x-axis, which is defined as running parallel to a transverse axis of the image sensor array.

5. An image sensor module as described in claim 2, wherein the mounting bracket is rotationally adjustable relative to an x-axis, which is defined as running parallel to a transverse axis of the image sensor array.

6. An image sensor module as described in claim 1, wherein the base plate is translationally adjustable relative to the optical system along a x-axis, which is defined as running parallel to a transverse axis of the image sensor array.

7. An image sensor module as described in claim 1, further comprising a bracket position alignment system enabling the image sensor mounting bracket to be oriented relative to the base plate, the bracket position alignment system including at least one support pin for preloading the mounting bracket relative to the base plate.

8. An image sensor module as described in claim 7, wherein the bracket position alignment system comprises: two support pins for preloading the mounting bracket relative to the base plate.

9. An image sensor module as described in claim 7, wherein the bracket position alignment system comprises: at least one set screw for controlling a distance between the mounting bracket and the base plate.

10. An image sensor module as described in claim 9, wherein the bracket position alignment system comprises:
    three set screws for controlling a distance between the mounting bracket an the base plate at three points.

11. An image sensor module as described in claim 10, wherein a first set screw controls rotation of the mounting bracket relative to a y-axis, which is defined as running parallel to a longitudinal axis of the image sensor array, and second or third set screws control rotation of the mounting bracket relative to an x-axis, which runs parallel to a transverse axis of the image sensor array, and all three set screws used together translate the image sensor array along the z-axis which is defined as being orthogonal to the image plane of the image sensor array.

12. An image sensor module as described in claim 1, wherein the base plate is translationally adjustable relative to the optical system along a y-axis, which is defined as running parallel to a longitudinal axis of the image sensor array.

13. An image sensor module as described in claim 1, wherein the base plate is rotationally adjustable relative to the optical system relative to a z-axis, which is defined as being orthogonal to an image plane of the image sensor array.

14. An image sensor module as described in claim 13, wherein the base plate is translationally adjustable relative to the optical system along an x-axis, which is defined as running parallel to a transverse axis of the image sensor array.

15. An image sensor module for an image acquisition device, said module comprising: an image sensor array that detects light imaged by an optical system, the image sensor array being carried by an image sensor mounting bracket being positionable relative to a base plate to calibrate the image sensor array to the optical system, the base plate adapted to be mounted to the optical system; and an image sensor alignment system that enables calibration of the position of the image sensor array relative to the optical system, the image sensor alignment system including a base plate position adjusting system enabling the base plate, and thus the image sensor array, to be oriented relative to the optical system, the base plate position adjusting system including multiple set screws extending from the base plate such that adjustment of the multiple set screws enables the base plate to be moved along with the image sensor array with at least three degrees of freedom.

16. An image sensor system as described in claim 15, wherein the image sensor module enables positioning of the image sensor array in six degrees of freedom.

17. An image sensor system as described in claim 15, further comprising a sensor daughterboard that controls and is mechanically supported by the image sensor array.

18. An image sensor module as described in claim 15, wherein the image sensor alignment system further includes a bracket position alignment system having at least one support pin for preloading the mounting bracket relative to a base plate mounted to the optical system.

19. An image sensor module as described in claim 18, wherein the bracket position alignment system comprises: two support pins for preloading the mounting bracket relative to the base plate.

20. An image sensor module as described in claim 18, wherein the bracket position alignment system comprises: at least one set screw for controlling a distance between the mounting bracket and the base plate.

21. An image sensor module as described in claim 20, wherein the bracket position alignment system comprises:

three set screws for controlling a distance between the mounting bracket and the base plate at three points.

22. The method of claim 21, wherein the step of providing a bracket position alignment system further comprises:

providing three set screw for controlling a distance between the mounting bracket and the base plate at three points.

23. A method of providing an image sensor module for use with an image acquisition device, said method comprising the steps of:

providing a base plate that is adapted to be mounted to an optical system; providing an image sensor mounting bracket that is adapted to carry an image sensor array that detects images formed by the optical system, the mounting bracket being positionable relative to the base plate to calibrate the image sensor array to the optical system; and providing a base plate position adjusting system enabling the base plate, and thus the image sensor array, to be oriented relative to the optical system, the base plate position adjusting system including multiple set screws extending between a module mounting area of the optical system and the base plate, the adjustment of the multiple set screws enabling the base plate and the image sensor array to be moved with at least three degrees of freedom.

24. The method of claim 23, wherein the base plate is translationally adjustable relative to the optical system along an x-axis, which is defined as running parallel to a transverse axis of the image sensor array.

25. The method of claim 23, wherein the step of providing a bracket position alignment system further comprises:

providing at least one set screw for controlling a distance between the mounting bracket and the base plate.

26. The method of claim 23, wherein the step of providing a bracket position alignment system further comprises:

providing two support pins for preloading the mounting bracket relative to the base plate.

27. The method of claim 23, further comprising providing a bracket position alignment system enabling the image sensor mounting bracket to be oriented relative to the base plate, the providing the bracket position alignment system including providing at least one support pin for preloading the mounting bracket relative to the base plate.

28. The method of claim 27, wherein the step of providing a bracket position alignment system further comprises:

providing at least one set screw for controlling a distance between the mounting bracket and the base plate.

29. The method of claim 27, further providing the mounting bracket to be translationally adjustable along a z-axis, which is defined as being orthogonal to an image plane of the image sensor array.

30. The method of claim 29, further providing the mounting bracket to be rotationally adjustable relative to a y-axis, which is defined as running parallel to a longitudinal axis of the image sensor array.

31. The method of claim 30, further providing the mounting bracket to be rotationally adjustable relative to an x-axis, which is defined as running parallel to a transverse axis of the image sensor array.

32. The method of claim 29, further providing the mounting bracket to be rotationally adjustable relative to an x-axis, which is defined as running parallel to a transverse axis of the image sensor array.

33. The method of claim 23, wherein the base plate is translationally adjustable relative to the optical system along a y-axis, which is defined as running parallel to a longitudinal axis of the image sensor array.

34. The method of claim 23, wherein the base plate is rotationally adjustable relative to the optical system relative to a z-axis, which is defined as being orthogonal to an image plane of the image sensor array.

35. The method of claim 34, wherein the base plate is translationally adjustable relative to the optical system along an x-axis, which is defined as running parallel to a transverse axis of the image sensor array.

* * * * *